Nov. 16, 1943.　　　　L. D. ISAACSON　　　　2,334,329
VARIABLE APERTURE FOR OPTICAL PROJECTORS
Filed June 5, 1940
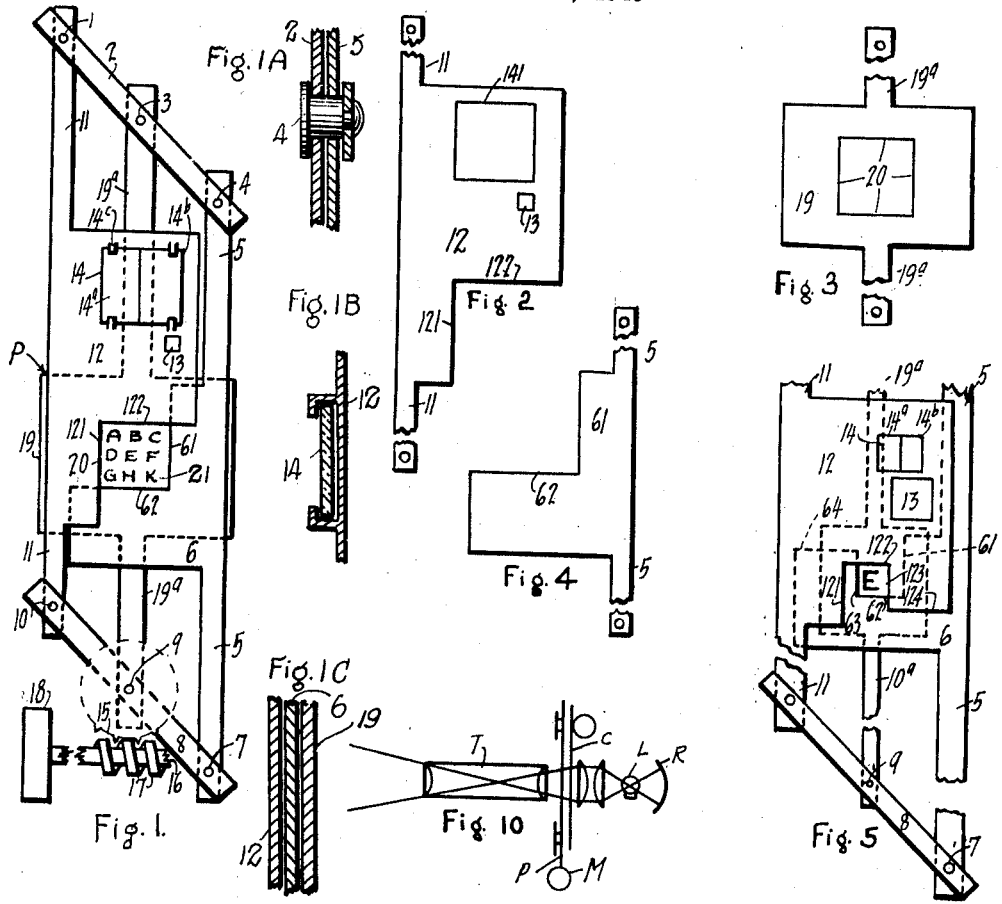
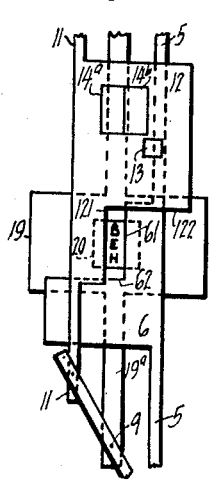
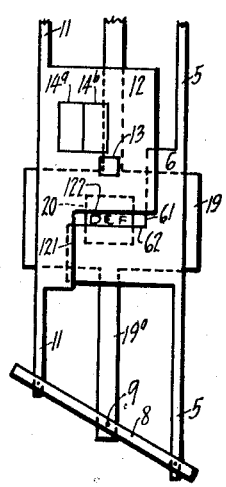
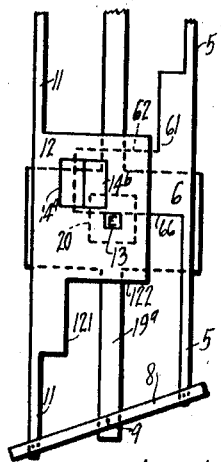
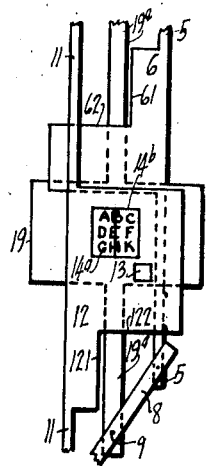
Leon Isaacson
by M. P. Parish
Attorney Patented Nov. 16, 1943

2,334,329

UNITED STATES PATENT OFFICE 2,334,329

VARIABLE APERTURE FOR OPTICAL PROJECTORS

Leon D. Isaacson, Brooklyn, N. Y.

Application June 5, 1940, Serial No. 338,843

4 Claims. (Cl. 88—20)

This invention relates to optical instruments and more particularly to a novel arrangement of apertures and color filters in a projection apparatus containing a slide with test characters for use by refractionists in the course of determining visual acuity and refractive errors.

One object of my invention is to provide a horizontal aperture, the size of which can be continuously varied instead of being limited to fixed steps, through which a single horizontal line of test characters of any size or a multiplicity of such lines can be projected.

Another object of my invention is to provide a continuously variable vertical aperture through which a vertical line or lines of test characters can be projected as desired.

A further object is to provide an aperture that permits selection and projection of single characters from a line of test characters.

Additional objects of my invention are to make possible the selection and projection of colored or uncolored spots of light and means for coloring the background of the projected test characters to provide the so-called "bichrome" or "red-green" test used by refractionists.

Other important objects are to maintain the apertures and color filters just mentioned in substantially the same focal plane as the test character slide so that they can all be projected with equal sharpness of imagery; and to make it possible to control and manipulate the apertures and color filters with the greatest possible simplicity. In the arrangement of my invention herein described, rotation of a single knob makes possible the selection and control of all of the apertures and filters.

The drawing, Figs. 1, 2, 3 and 4, shows one practical embodiment of my invention. Fig. 1 is a full view of the complete mechanism. Figs. 1A, 1B, and 1C are side elevations of portions shown in Fig. 1. Figs. 2, 3, and 4 are full views of salient elements of the mechanism.

Fig. 5 is an elevation view showing cooperative masks of other contour than as in Figs. 1-4 and showing a formed aperture having sides 62, 63 (of member 6) and 122, 123 (of member 12), for projection of a single character.

Fig. 6 is an elevation view on reduced scale showing the position of the masks of Fig. 1 upon relative clockwise movement therefrom for projection of a vertical line of characters.

Fig. 7 is an elevation view showing the position of the masks of Fig. 1 upon relative counterclockwise movement therefrom for projection of a horizontal line of characters.

Fig. 8 is an elevation view showing the position of the masks of Fig. 1 upon further relative counterclockwise movement therefrom for projection of a single character bringing single permanent aperture 13 into the light rays.

Fig. 9 is an elevation view upon further counterclockwise movement from Fig. 8 and bringing the bichrome filter element into the light rays.

Fig. 10 is a schematic showing of my device P mounted in a projector M or the like and showing relative light source L, reflector R, telescope T, and character slide C.

2, 5, 8, and 11 are rigid arms pivotally connected at their extremities to form a parallelogram. 3 is a fixed pivotal point midway between the extremities of arm 2, and 9 is a fixed pivotal point midway between the extremities of arm 8. Arms 2 and 8 are free to rotate about, and are in a plane perpendicular to, their pivotal midpoints, thus causing arms 5 and 11 to move equal amounts in opposite directions, to move in parallel planes, and to maintain constant parallelism with each other. The distance between arms 5 and 11 will vary, however, with the amount of rotation of arms 2 and 8. Consequently, any masks or aperture frames attached to arms 5 and 11 will maintain a constant angular orientation with respect to each other, will remain in fixed parallel planes, and will approach or recede from each other as arm 2 (and consequently 8) is rotated about its pivotal midpoint.

Attached to arms 5 and 11 are mask members 6 and 12, of thin metal or other suitable opaque material, so mounted that their planes are parallel to each other and perpendicular to the axes of rotation at 3 and 9, and are just sufficiently apart to permit one to slide freely over the other. Mask 12 is shaped similarly to mask 6 except that it is extended to include small aperture 13 and another aperture 141 covered by bichrome filter 14, the filter consisting of two pieces of translucent material differently colored, usually red and green 14a and 14b, an edge of one abutting an edge of the other as shown in Fig. 1.

The axes of rotation of all pivotal connections are parallel to the optical axis of the projection apparatus, and the axes of rotation of the pivotal points, 3 and 9, are in a vertical plane containing the optical axis.

Mounted immediately adjacent to and in a plane parallel with masks 6 and 12 is mask 19, containing a fixed aperture, 20. The center of aperture 20 coincides with the optical axis; its size, shape, and purpose will be described hereinafter.

A spur gear 15 is coupled to arm 8 so that its rotation moves arm 8 about pivotal point 9. The rotation of arm 8 about point 9 produces a like rotation of arm 2 about point 3 by transmission through arms 5 and 11. The worm gear 17, mounted on shaft 16 cooperates with gear 15 to rotate it. The knob 18, affixed to shaft 16, acts as the operating control.

This whole assembly is mounted in a projection apparatus M containing a slide C bearing the test characters commonly used by refractionists in determining visual acuity and refractive errors, in a plane parallel to and as close as possible to that of the test character slide. The assembly is inherently of such a nature as to allow such close mounting, thereby allowing projection of the apertures with substantially the same sharpness of imagery as that of the test characters.

Examination of Fig. 1 will reveal that for the particular angular position of arm 8 illustrated, masks 6 and 12 cooperate to form a square aperture having sides 61, 62 (of member 6) and 121 and 122 (of member 12) permitting projection of a square block of test characters 21 through it. By proper proportioning of the parts, this square can be made as large as desired, within the useful limits of the optical field of the projector. In the arrangement shown it is to be understood that the whole assembly is mounted so that the center of the square aperture coincides with the optical axis of the projector so that the area covered by the square aperture becomes the useful area of projection.

The size and shape of aperture 20 coincides with the size and shape of the aperture formed by the cooperation of masks 6 and 12 at the particular angular position of arm 8 described in the preceding paragraph.

As arm 8 is rotated clockwise from the position shown in Fig. 1 to the position shown in Fig. 6, masks 6 and 12 cooperate to form a vertical aperture of progressively diminished width, permitting masking out of vertical lines of projected test characters as desired. In these positions, the vertical dimension of the illuminated area on the screen would be greater than that of the original square were it not for mask 19 which prevents the vertical dimension of the projected area of illumination from increasing as its width is decreased.

As arm 8 is progressively rotated counter-clockwise from the position shown in Fig. 1 to the position shown in Fig. 7, masks 6 and 12 form an aperture whose shape is that of a horizontal slit of progressively diminishing vertical dimension, permitting masking out of horizontal lines of projected test characters as desired. Mask 19 prevents the width of the projected aperture from increasing as its height is decreased. Because mask 6 moves by an amount equal to the movement of mask 12, although in the opposite direction, the center of the aperture remains on the optical axis regardless of the size or shape to which the aperture is adjusted. Accordingly, more or less of a margin can be left around a projected line or group of lines of test characters, as desired, without need for shifting the position of the projected characters to keep them centered in the aperture. The particular lines of test characters being projected can be changed either by shifting the test character slide or by shifting the complete aperture assembly.

Further counter-clockwise rotation of arm 8 to the position shown in Fig. 8 will result in aperture 13 being moved to a position in which its center will coincide with the optical axis. At this point it will be completely uncovered by mask 6, although the latter will continue to cover the bichrome filter 14. Aperture 13 is of such size that it permits projection of but a single test character. Choice of the projected character can be accomplished either by shifting the test character slide or by shifting the complete aperture assembly.

Continued counter-clockwise rotation of arm 8 to the position shown in Fig. 9 results in bichrome filter 14 being moved fully into the projection area, and aperture 13 and mask 6 being moved completely out of the projection area, permitting the test characters to be projected through the two colored filter and to appear on the screen against a two colored background, to provide the so-called "bichrome test" as used by refractionists.

The particular apertures and bichrome filter shown are those most commonly useful in projection apparatus of the type mentioned. However, it is obvious that other shapes and types of apertures, should they be deemed desirable, could be formed by the movement of masks 6 and 12, suitably changing the contours of, and apertures in, one or more of said masks, without departing from the spirit of my invention. For example masks 6 and 12 may have edge formations as shown in Fig. 5, in which edges 63 and 64 are added to member 6 and edges 123, 124 are added to member 12 and mask 12 may have aperture 13 of larger size and in different position as shown. Similarly, the aperture mechanism and projector assembly can be used with slides containing other types of subject matter wherein it is desired to selectively project various areas of the slide, as, for example, those used for educational or sales purposes.

I claim:

1. A variable aperture device for an optical projection apparatus thru which aperture areas of a projection slide may be selectively projected, means to vary said aperture comprising two pivotally connected planarly parallel plate masks having cooperating edge formations in each cooperatively forming the aperture as the masks are arcuately pivoted, a fixed third plate mask adjacent said pair and having a central aperture registrable with the variable aperture, turnable toggles mounted one at the top and another at the bottom of the third mask and having right and left ends, the right end of each toggle pivotally connected with one movable mask and the left end of each toggle pivotally connected with the other movable mask, whereby arcuate movement of a toggle is partaken of by the pivoted masks so that the masks move arcuately planarly parallel and opposite to each other.

2. The device of claim 1 including means to turn a toggle comprising a single control cooperatively geared with said toggle.

3. The device of claim 1 in which one of the movable masks has at least one aperture of a fixed size therein movably registrable with the third mask aperture to register apertures independent of the cooperative mask edge formations.

4. The device of claim 1 in which one of the movable masks has at least one aperture of a fixed size therein movably registrable with the third mask aperture to form apertures independent of the cooperative mask edge formations and at least one color filter mounted on said movable mask to overlie one or more of its permanent apertures.

LEON D. ISAACSON.